United States Patent
Masuda

(10) Patent No.: US 7,057,644 B2
(45) Date of Patent: Jun. 6, 2006

(54) CAMERA SYSTEM, CAMERA, AND LENS APPARATUS WITH VARIABLE LENGTH VIBRATION CORRECTION DATA

(75) Inventor: Kazunori Masuda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 10/172,646

(22) Filed: Jun. 14, 2002

(65) Prior Publication Data

US 2003/0007075 A1   Jan. 9, 2003

(30) Foreign Application Priority Data

Jun. 18, 2001   (JP)   ............... 2001-183380

(51) Int. Cl.
*H04N 5/228*   (2006.01)
*G03B 7/00*   (2006.01)
*H04N 5/235*   (2006.01)

(52) U.S. Cl. .............. 348/208.2; 348/208.7; 396/55

(58) Field of Classification Search ......... 348/208.99, 348/208.2, 208.4–208.5, 208.7, 351–352; 396/52, 55

See application file for complete search history.

(56) References Cited

U.S. PATENT DOCUMENTS

| | | | | |
|---|---|---|---|---|
| 5,117,246 A | * | 5/1992 | Takahashi et al. | 348/208.99 |
| 5,416,558 A | * | 5/1995 | Katayama et al. | 348/208.12 |
| 5,541,693 A | * | 7/1996 | Enomoto | 396/55 |
| 5,608,703 A | * | 3/1997 | Washisu | 348/208.7 |
| 5,615,397 A | * | 3/1997 | Shiomi et al. | 348/208.11 |
| 5,995,761 A | * | 11/1999 | Wakabayashi et al. | 396/54 |
| 6,088,533 A | | 7/2000 | Shiomi | 396/52 |
| 6,429,895 B1 | * | 8/2002 | Onuki | 348/208.99 |

* cited by examiner

*Primary Examiner*—Ngoc-Yen Vu
*Assistant Examiner*—Carramah J. Quiett
(74) *Attorney, Agent, or Firm*—Morgan & Finnegan LLP

(57) ABSTRACT

A camera control circuit of a camera system sends vibration correction data with two different data lengths during image-taking and during image-taking preparation, respectively. The latter data length is shorter. A lens control circuit controls a vibration correction driving unit based on the vibration correction data. The lens control circuit converts vibration correction data with the second data length into data equivalent to vibration correction data with the first data length. Thus, loads on the camera control circuit during image-taking preparation can be reduced while providing image vibration correction inexpensively.

6 Claims, 15 Drawing Sheets

FIG.4 (A)    MAIN PROCESS IN CAMERA
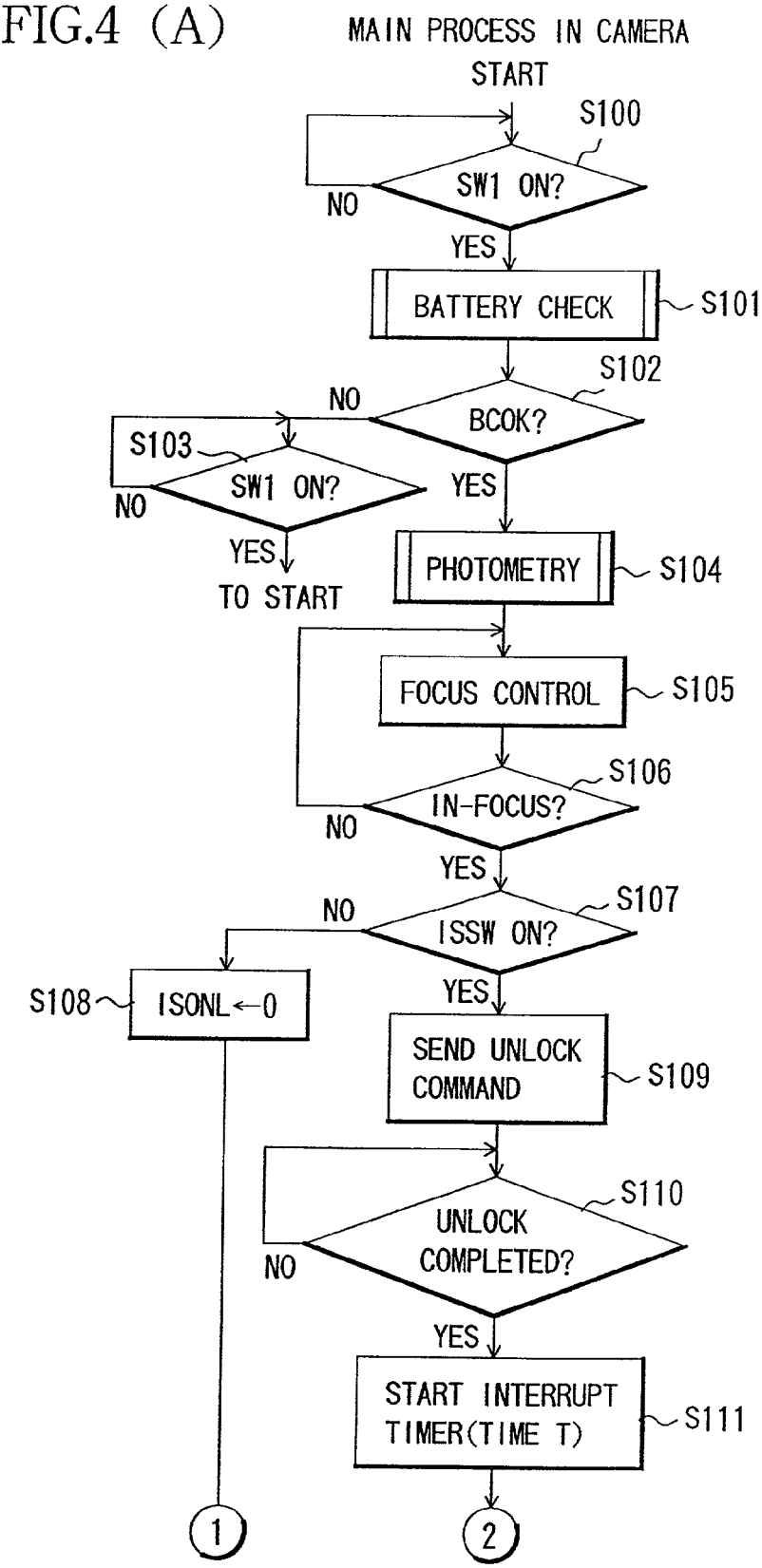

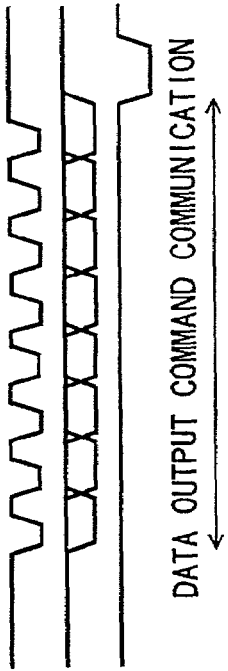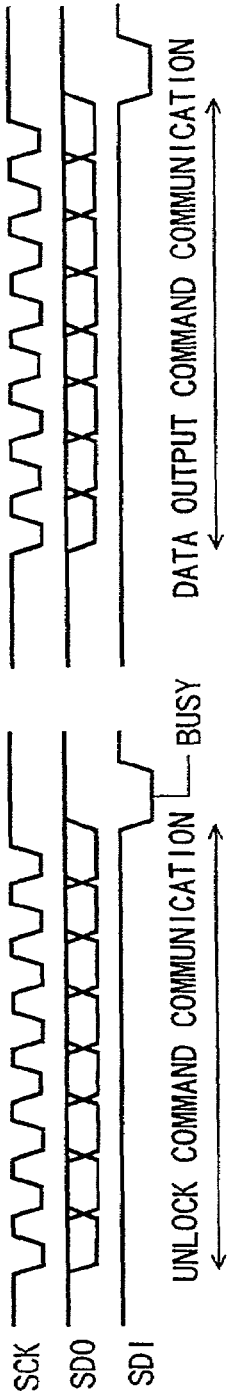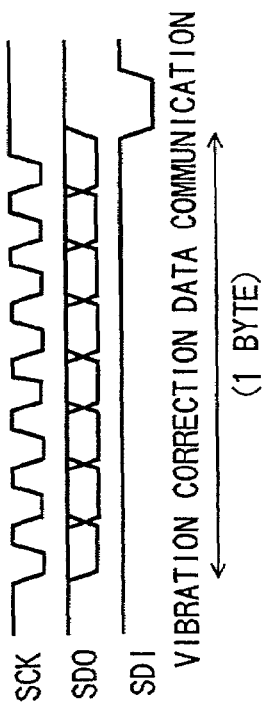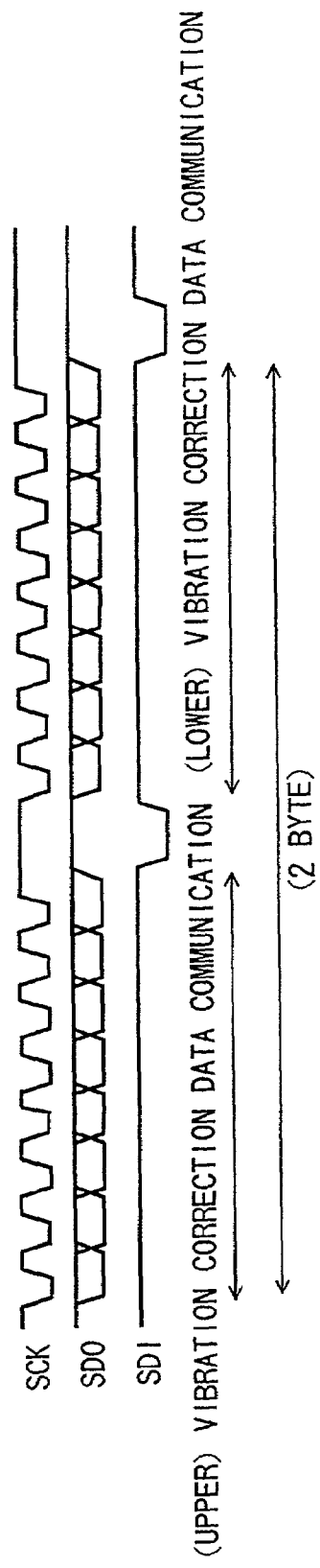

FIG.11

| STATE OF SWs | MINIMUM RESOLUTION | MAXIMUM VIBRATION CORRECTION ANGLE | NUMBER OF REQUIRED DATA BITS | LENGTH OF SEND DATA |
|---|---|---|---|---|
| SW2 ON | 0.001° | ±0.500° | 1000bit | 2byte |
| SW1 ON | 0.004° | ±0.512° | 256bit | 1byte |

CAMERA SYSTEM, CAMERA, AND LENS APPARATUS WITH VARIABLE LENGTH VIBRATION CORRECTION DATA

BACKGROUND OF THE INVENTION

1. Filed of the Invention

The present invention relates to a camera system, camera, and lens apparatus having an image vibration correction capability.

2. Description of the Related Art

A typical image vibration correction system contained in a camera system that has been generally used is one that, as shown in FIG. 12, has a vibration sensor (not shown) provided in an interchangeable lens apparatus 108 detachable from a camera 101 which detects the degree of user's hands shake and drives a vibration correction optical unit 109 contained in an image-taking optical member 110 based on an output from the vibration sensor.

An image vibration correction system is proposed in Japanese Patent Laid-Open No. 7-191354(U.S. Pat. No. 6,088,533) in which a vibration sensor is provided in a camera, a vibration correction optical unit is provided in an interchangeable lens apparatus, vibration correction data in the yaw direction (along the horizontal axis of the camera) and the pitch direction (along the vertical axis of the camera (in the gravity direction)) is sent from the camera to the interchangeable lens apparatus over a signal line, and the interchangeable lens apparatus drives the vibration correction optical unit based on the sent data.

However, in such a camera system that has the image vibration correction system having the vibration sensor in the camera and having the vibration correction optical unit and driving unit in the interchangeable lens apparatus, the amount of communicating traffic between the camera and lens during an image-taking-preparation period tends to be large compared with during an image-taking period because more calculations and operations such as automatic focusing (AF) are required.

If additional communications for image vibration correction are performed between the camera and lens in the system, the total communicating traffic increases and the traffic places a heavier load on the CPU of the camera, especially during an image-taking-preparation operation.

To solve this problem, a CPU capable of high-speed processing may be used as the CPU of the camera. However, such a CPU is more expensive than a typical CPU designed for processing operations such as a camera sequence operation and therefore is not suitable for camera systems for which cost reduction is desirable.

SUMMARY OF THE INVENTION

It is an object of the present invention to provide a camera system that includes a camera and lens apparatus, can reduce loads on a camera control circuit for controlling the camera and performing image vibration correcting calculations, and can properly correct image vibrations with an inexpensive configuration.

To achieve the object, according to the present invention, a camera system having a camera and a lens apparatus detachable from the camera includes: a communication circuit which communicates data between the camera and the lens apparatus; a vibration detector provided in the camera, which detects vibration of the camera; a camera control circuit provided in the camera, which calculates vibration correction data based on an output from the vibration detector and sends the calculated vibration correction data to the lens apparatus through the communication circuit; a vibration correction optical member provided in the lens apparatus, which is driven for correcting an image vibration; a vibration correction driving unit provided in the lens apparatus, which drives the vibration correction optical member; and a lens control circuit provided in the lens apparatus, which controls the vibration correction driving unit based on the vibration correction data sent from the camera through the communication circuit.

The camera control circuit sends the vibration correction data with a first data length to the lens apparatus during an image-taking operation of the camera, and sends the vibration correction data with a second data length shorter than the first data length to the lens apparatus during an image-taking preparation operation of the camera; and the lens control circuit controls the vibration correction driving unit based on the vibration correction data with the first data length, converts the vibration correction data with the second data length into data equivalent to vibration correction data with the first data length and controls the vibration correction driving unit based on the converted vibration correction data.

To achieve the above-described object, a camera system having a camera and a lens apparatus detachable from the camera includes: a communication circuit which communicates data between the camera and the lens apparatus; a vibration detector provided in the camera, which detects vibration of the camera; a camera control circuit provided in the camera, which calculates vibration correction data representing the amount of vibration correction based on an output from the vibration detector, and sends the calculated vibration correction data to the lens apparatus through the communication circuit; a vibration correction optical member provided in the lens apparatus, which is driven for correcting an image vibration; a vibration correction driving unit provided in the lens apparatus, which drives the vibration correction optical member; and a lens control circuit provided in the lens apparatus, which controls the vibration correction driving unit based on the vibration correction data sent from the camera through the communication circuit.

The camera control circuit sends first vibration correction data, each bit of which represents a first smallest vibration correction amount, to the lens apparatus during an image-taking operation of the camera, and sends second vibration correction data, each bit of which represents a second smallest vibration correction amount larger than the first smallest vibration correction amount, to the lens apparatus during an image-taking preparation operation of the camera. And the lens control circuit controls the vibration correction driving unit based on the first vibration correction data, converts the second vibration correction data into data equivalent to the first vibration correction data and controls the vibration correction driving unit based on the converted vibration correction data.

To achieve the above-described object, according to the invention, a camera which a lens apparatus can be attached to and detached from and can drive a vibration correction optical member based on vibration correction data sent from the camera in order to correct an image vibration includes: a communication circuit which communicates data between the camera and the lens apparatus; a vibration detector which detects vibration of the camera; and a camera control circuit which calculates vibration correction data based on an output from the vibration detector and sends the calculated vibration correction data to the lens apparatus through the communication circuit. The camera control circuit sends the vibration correction data with a first data length to the lens apparatus during an image-taking operation of the camera and sends the vibration correction data with a second data length shorter than the first data length to the lens apparatus during an image-taking preparation operation of the camera.

To achieve the above-described object, according to the present invention, a camera which a lens apparatus can be attached to and detached from and can drive a vibration correction optical member based on vibration correction data sent from the camera in order to correct an image vibration, the camera includes: a communication circuit which communicates data between the camera and the lens apparatus; a vibration detector which detects vibration of the camera; and a camera control circuit which calculates vibration correction data based on an output from the vibration detector and sends the calculated vibration correction data to the lens apparatus through the communication circuit. The camera control circuit sends first vibration correction data, each bit of which represents a first smallest vibration correction amount, to the lens apparatus during an image-taking operation of the camera, and sends second vibration correction data, each bit of which represents a second smallest vibration correction amount larger than the first smallest vibration correction amount, to the lens apparatus during an image-taking preparation operation of the camera.

To achieve the above-described object, according to the present invention, a lens apparatus capable of being attached to and detached from a camera calculating vibration correction data based on an output from a vibration detector that detects vibration of the camera, outputting vibration correction data with a first data length during an image-taking operation, and outputting vibration correction data with a second data length during an image-taking preparation operation, includes: a communication circuit which communicates data between the lens apparatus and the camera; a vibration correction optical member which is driven for correcting an image vibration; a vibration correction driving unit which drives the vibration correction optical member; and a lens control circuit for controlling the vibration correction driving unit based on vibration correction data sent from the camera through the communication circuit. The lens control circuit controls the vibration correction driving unit based on the vibration correction data with the first data length, converts the vibration correction data with the second data length into data equivalent to vibration correction data with the first data length and controls the vibration correction based on the converted vibration correction data.

To achieve the above-described object, according to the present invention, a lens apparatus capable of being attached to and detached from a camera, calculating vibration correction data representing the amount of vibration correction based on an output from a vibration detector that detects vibration of the camera, outputting first vibration correction data, each bit of which represents a first smallest vibration correction amount, during an image-taking operation, and outputting second vibration correction data, each bit of which represents a second smallest vibration correction amount larger than the first smallest vibration correction amount, during an image-taking preparation operation, includes: a communication circuit which communicates between the lens apparatus and the camera; a vibration correction optical member which is driven for correcting an image vibration; a vibration correction driving unit which drives the vibration correction optical member; and a lens control circuit which controls the vibration correction driving unit based on vibration correction data sent from the camera through the communication circuit. The lens control circuit controls the vibration correction driving unit based on the first vibration correction data, converts the vibration correction data into data equivalent to the first vibration correction data and controls the vibration correction driving unit based on the converted vibration correction data.

A detailed configuration of the camera system, camera, and lens apparatus of the invention, the above and other objects and features of the invention will be apparent from the embodiment, described below.

BRIEF DESCRIPTION OF THE DRAWINGS

FIGS. 7(A) to (D) are timing charts of data transmission from the camera to an interchangeable lens apparatus in the camera system shown in FIG. 1;

FIG. 11 shows relationships between minimum resolutions and transmission data lengths in vibration correction control in different states of the camera system shown in FIG. 1.

DETAILED DESCRIPTION OF THE PREFERRED EMBODIMENTS

Hereinafter, a preferred embodiment of the invention will be described in detail with reference to the drawings.

Figure 1:
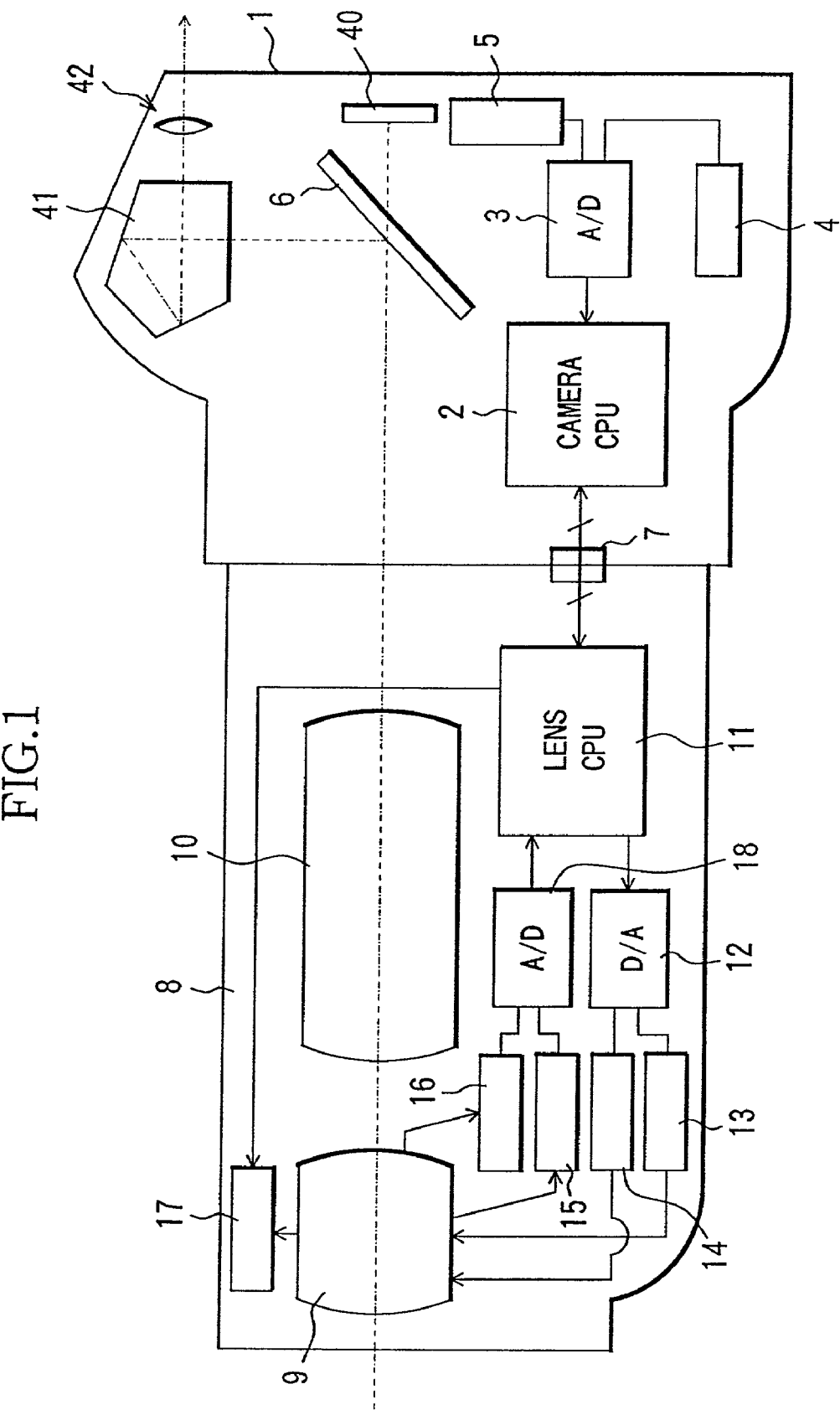
FIG. 1 shows a configuration of a camera system according to an embodiment of the present invention.

FIG. 1 shows a configuration of a camera system according to an embodiment of the present invention that includes a camera and an interchangeable lens apparatus. The embodiment, in which vibration sensors 4 and 5 are provided in the camera 1 and a vibration correction optical unit 9 is provided in the interchangeable lens apparatus, will be described below.

In FIG. 1, provided in the camera 1 is a camera CPU 2 performing various control operations of the camera 1. The vibration sensors 4 and 5 are also disposed as shown for detecting vibrations in the yaw direction and pitch direction, respectively, of the camera 1. Outputs from the vibration sensors 4 and 5 are converted by an A-D converter 3 into digital data and provided to the camera CPU 2 as vibration data.

Figure 2:
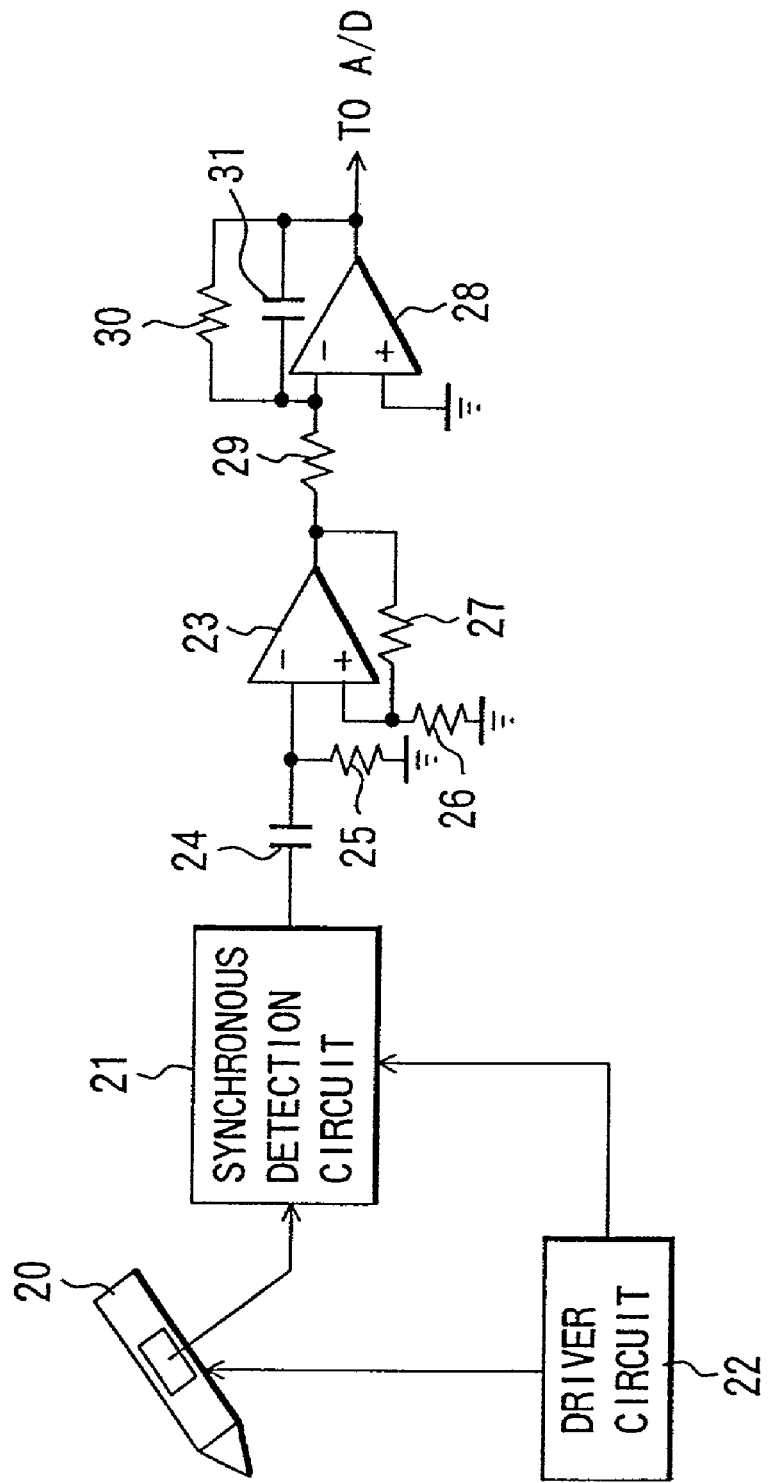
FIG. 2 shows a configuration of an angular speed sensor used in the camera system shown in FIG. 1.

A specific internal configuration of the vibration sensors 4 and 5 is shown in FIG. 2 by way of example, which includes a vibration gyro 20, which is an angular speed sensor, and integrator circuits 28–31.

The vibration gyro 20 in FIG. 2 is resonance-driven by a driver circuit 22 and its output is converted by a synchronous detection circuit 21 into a predetermined angular speed output. The output from the synchronous detection circuit 21 typically contains an unnecessary DC offset. The CD offset is removed by a high-pass filter including a capacitor 24 and a resistance 25 and only the remaining vibration signal is amplified by an amplifier including an operational amplifier 23 and resistances 26 and 27.

Then, the output from the amplifier 23 is integrated by an integrator circuit including an operational amplifier 28, resistances 29 and 30, and a capacitor 31 and converted into an output proportional to a vibration displacement. The integrated output is provided to the A-D converter 3 shown in FIG. 1, as described above.

Returning to FIG. 1, the camera CPU 2, which has received the integrated output, calculates a drive amount (hereinafter called "vibration correction amount) in the yaw direction and pitch direction of a vibration correction optical unit 9 within an image-taking optical member 10 in an interchangeable lens apparatus 8. The vibration correction amount is required for correcting an image vibration on a solid-state image pick up device (formed with a CCD, CMOS, and other elements) 40 that is caused by a camera vibration corresponding to the integrated output. The camera CPU 2 then transfers the vibration correction amount data (hereinafter called "vibration correction data") to a lens CPU 11 provided in the interchangeable lens apparatus 8 over a typical serial bus line (communication circuit) 7 used for communicating information and data between the camera 1 and the lens apparatus 8.

In the interchangeable lens apparatus 8, outputs from position detection sensors 15 and 16, which detect the absolute positions in the yaw and pitch directions of a vibration correction lens (indicated by reference numeral 54 in FIG. 3) in the vibration correction optical unit 9, are converted by an A-D converter 18 into digital data, and the digital data is provided into the lens CPU 11. The lens CPU 11 calculates a target position of the vibration correction lens based on the vibration correction data provided from the camera CPU 2 and the information of the position of the vibration correction lens, which is represented by the outputs from the position detection sensors 15 and 16, and transfers the result of the calculation to a D-A converter 12. The vibration correction optical unit 9 is driven by driver circuits 13 and 14 based on the output from the D-A converter 12 to correct the image vibration.

Reference numeral 17 in FIG. 1 indicates a driver circuit of an actuator, which is not shown, for driving a mechanism for mechanically locking the vibration correction optical unit 9 (therefore the vibration correction lens) in a predetermined position in the optical axis position when image vibration correction is not performed.

Figure 3:
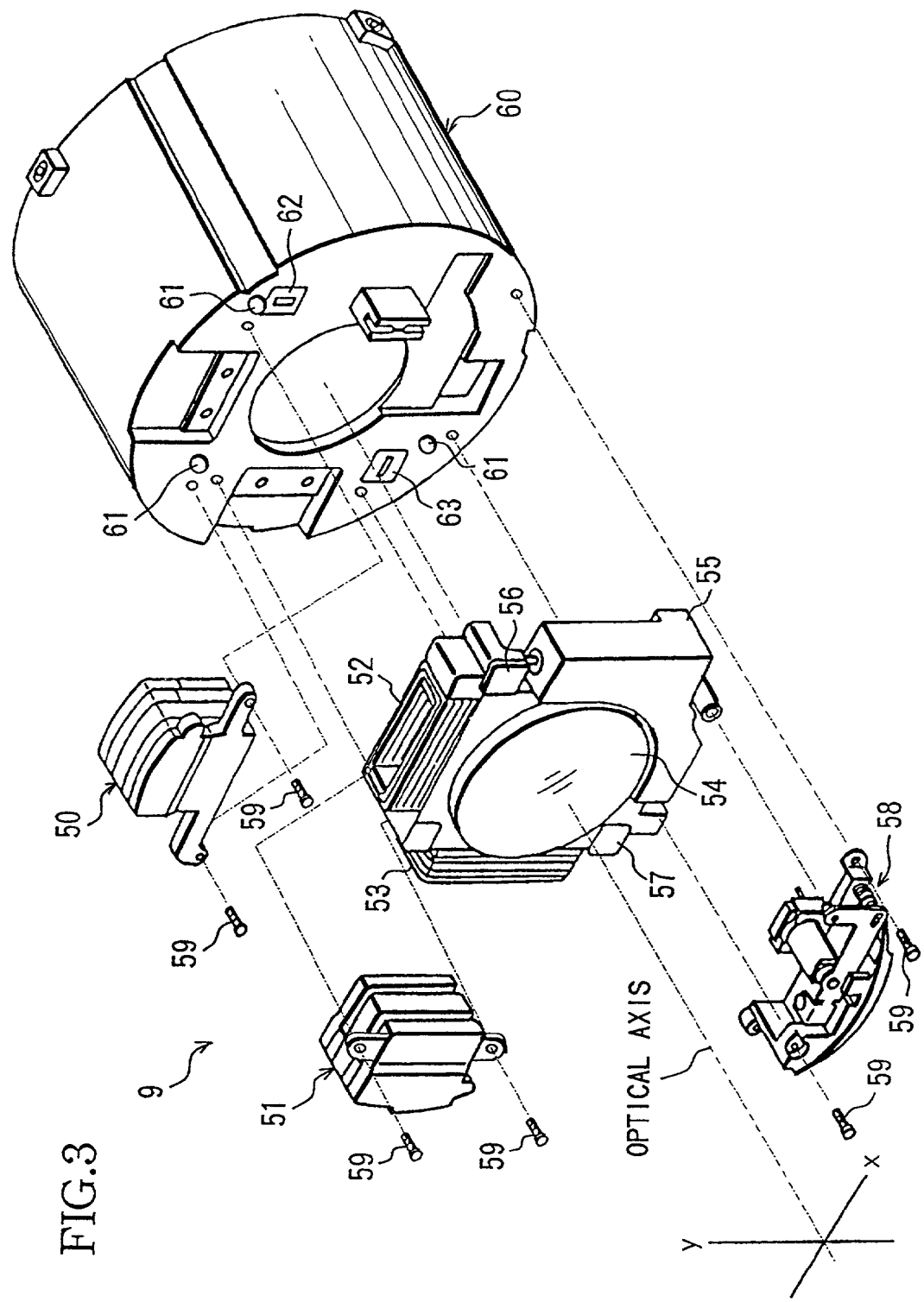
FIG. 3 shows a configuration of a vibration correction unit provided in the camera system shown in FIG. 1.

A specific configuration of the vibration correction optical unit 9 including the vibration correction lens is shown by way of example in FIG. 3.

FIG. 3 shows a configuration of a shift vibration correction optical unit, which corrects an image vibration by parallel-shifting the vibration correction lens 54 in the vibration correction optical unit 9 in the x- and y-directions orthogonal to each other on the plane orthogonal to its optical axis.

Reference numerals 50 and 51 in FIG. 3 indicate yoke assemblies, which are magnetic circuit units (vibration correction driving units) used as sources of driving force in the x-axis direction (in the yaw direction) and the y-axis direction (in the pitch direction), respectively. Reference numerals 52 and 53 indicate coil assemblies corresponding to their respective yoke assemblies. An electric current is provided to the coil assemblies 52 and 53 by the above-mentioned driver circuits 13 and 14 to drive the vibration correction lens 54, which is a part of an image-taking lens 10 shown in FIG. 1, in the x- and y-directions.

Reference numeral 55 indicates a support arm and frame (hereinafter collectively called "supporting frame") for fixing and supporting the vibration correction lens 54.

Movement of the vibration correction lens 54 is detected in a non-contact manner by infrared emitting diodes (IREDs) 56 and 57 moving together with the vibration correction lens 54, in combination with photo sensing devices (PSD) 62 and 63 mounted on a lens-barrel 60 supporting the entire vibration correction optical unit 9. The IREDs 56 and 57, PSDs 62 and 63, and processing circuits (not shown) form the above-described position detection sensors 15 and 16.

Reference numeral 58 indicates a lock mechanism for substantially and mechanically holding the vibration correction lens 54 in the optical axis position when the current supply to the vibration correction optical unit 9 is stopped. The actuator, not shown, which actuates the lock mechanism 58 is controlled by the lens CPU 11 through the driver circuit 17, as described above.

Reference numeral 59 indicates a charge pin for mounting the yoke assemblies 50 and 51 and the lock mechanism 58 onto the support frame 55. Reference numeral 61 indicates support balls disposed between the support frame 55 and the lens barrel 60 for guiding the support frame 55 within the plane orthogonal to the optical axis and preventing the support frame 55 from slanting with respect to the plane orthogonal to the optical axis.

Returning to FIG. 1, reference numeral 6 indicates a quick-return mirror capable of moving back and forth along the image-taking optical path within the camera 1. Reference numeral 41 indicates a pentaprism guiding an image-taking light beam reflected off the quick-return mirror 6 disposed in the image-taking optical path to an eyepiece 42 to enable an optical viewfinder observation of a subject image. When the quick-return mirror 6 is positioned within the image-taking light path, the subject light beam transmitted through the quick-return mirror 6 (half mirror) is taken by an image pickup device 40 and its image signal is displayed as an image on a liquid-crystal-display panel (not shown) to enable an electronic viewfinder observation of the subject. During image-taking, the quick-return mirror 6 moves out of the image-taking optical path and a bright subject image is taken by the image pickup device 40.

The present invention can be also applied to a camera system that uses silver film in place of the image pickup device 40.

Operation of main components in the present embodiment will be describe with respect to flowcharts shown in FIGS. 4(A), 4(B), 5(A), 5(B), 6, 8, 9(A), 9(B), and 10 and timing charts shown in FIGS. 7(A) through 7(D). In FIGS. 4(A) and 4(B), 5(A) and 5(B), and 9(A) and 9(B), lines added the same circled numeral connect to each other, respectively.

FIG. 4(A) and FIG. 4(B) are flowcharts of a main operation performed in the camera CPU 2 relating to image vibration correction.

Figure 4:
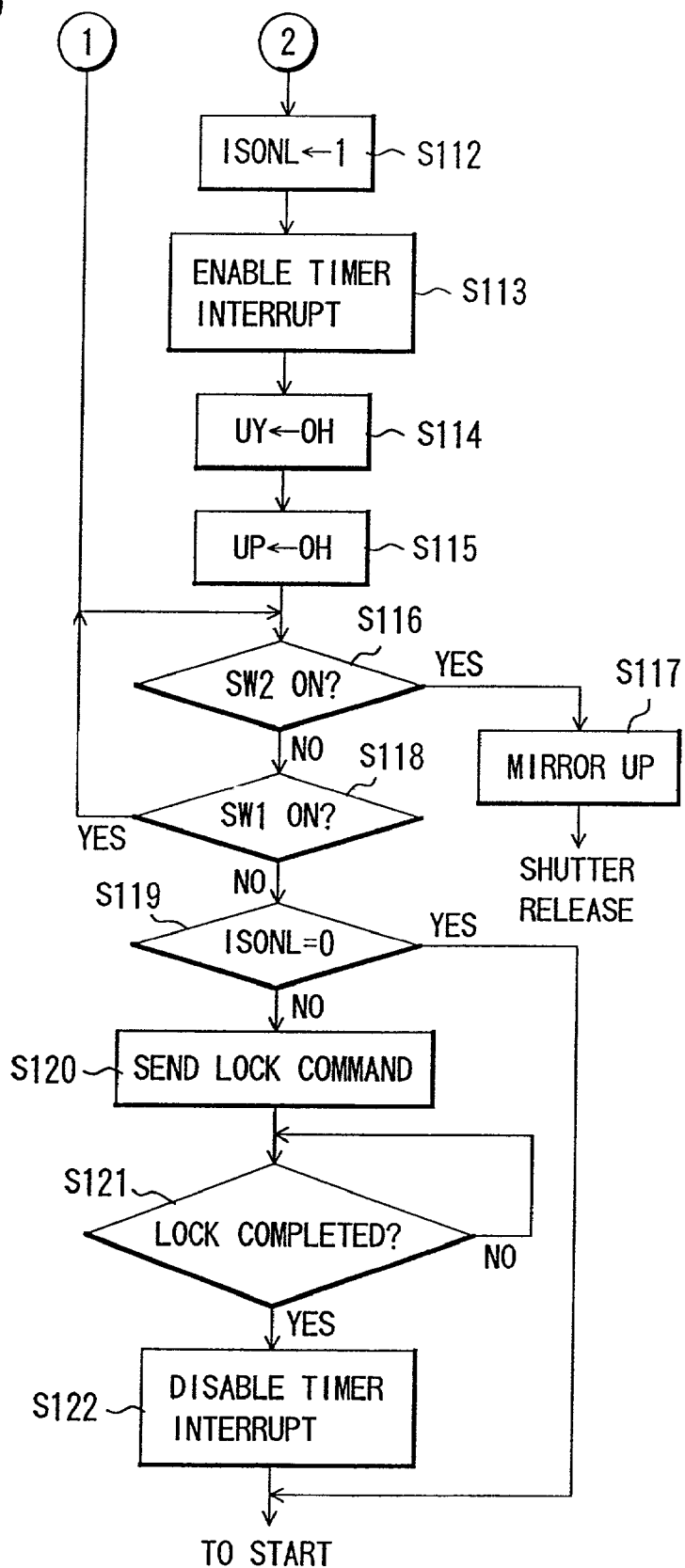
FIG. 4(A) and FIG. 4(B) are flowcharts of a main operation performed by a camera CPU in the camera system shown in FIG. 1.

First, at step S100 in FIG. 4, it is determined whether a switch SW1 (not shown) for directing the start of a release operation of the camera 1 is turned on. If it is determined that the switch SW1 is turned on, then it is determined at steps S101 and S102 whether a power supply voltage is sufficient for an operation guarantee voltage for the camera 1, through a battery check circuit (not shown). If the result of the determination shows that the power supply voltage is insufficient, the process proceeds from step S102 to step S103, where the process waits until the switch SW1 is turned off. When the switch SW1 is turned on, the process returns to the start.

On the other hand, if the result of the battery check at step S102 shows "OK," the process proceeds to step S104, where a photometry operation, which is an image-taking preparation operation, is performed. Then automatic focusing control, which is also an image-taking preparation operation, is performed at step S105. A pickup image signal obtained from the image pickup device 40 or an output from an optical sensor (not shown) is used to calculate information such as the drive amount of a focus lens (not shown) in the image-taking optical member 10, shown in FIG. 1, in order for the camera CPU 2 to obtain an in-focus state to a subject. The calculated information is communicated to the lens CPU 11. The lens CPU 11 drives the focus lens based on the information obtained through the communication to perform the automatic focusing control.

The automatic focusing control is continued until the in-focus state is detected at step S106. When the in-focus state is detected, the process proceeds to step S107.

At step 107, it is determined whether a switch ISSW (not shown, provided in the camera 1, for example) for triggering image vibration correction control is turned on. If the switch ISSW is turned off, then it is considered that no image vibration correction control is required and the process proceeds to step S108, where a flag ISONL in the camera CPU 2 is set to 0. Then the process proceeds to step S116.

On the other hand, if it is determined at step S107 that switch ISSW is turned on, then it is considered that image vibration correction is selected and the process proceeds to step S109, where a unlock instruction for the above-described lock mechanism 58 is transferred from the camera CPU 2 to the lens CPU 11 over the serial bus line 7.

How the information and instruction describe above are communicated is shown in the timing chart in FIG. 7(A). In FIG. 7(A), symbol "SCK" indicates a synchronous clock for serial communication, "SD0" indicates serial data transferred from the camera 1 to the interchangeable lens apparatus 8, and "SD1" indicates serial data transferred from the interchangeable lens apparatus 8 to the camera 1 at the same time.

As shown in FIG. 7(A), when an unlock command at least 1 byte long or more is sent from the camera 1 to the interchangeable lens apparatus 8, a BUSY signal indicating that the data is received is detected from SD1. This allows the camera CPU 2 to determine at step S110 that an unlock operation is completed (in practice the unlock operation is completed slightly after this, but the completion of the command reception is considered as the completion of the unlock, in terms of sequence).

Then the process proceeds to step S11, where a timer for causing an interrupt at predetermined intervals T is reset to restart time counting. Then, at step S112, flag ISONL in the camera CPU 2 that indicates an image vibration correction control state is set to 1. Then, the timer interrupt is enabled at step S113.

At steps S114 and S115, arithmetic registers UY and UP (described later) are initialized to 0H, then the process proceeds to step S116, where it is determined whether a switch SW2 (not shown) provided in the camera 1 for starting an image-taking operation is turned on. If the switch SW2 is turned on, the process proceeds to step S117, where the quick-return mirror 6 in the camera 1 shown in FIG. 1 is moved up (moved out) to start the image-taking operation (which is an operation of storing the image pickup signal from the image pickup device 40 in a storage medium, not shown, or a silver film exposure operation).

On the other hand, if it is determined at step S116 that the switch SW2 has not been turned on yet, it is considered that the user is still performing framing (picture composition) and the process proceeds to step S118. At step S118, it is determined whether the switch SW1 is still turned on. If it is determined that the switch SW1 is in the on state, the process returns to step S116 and the above-described steps are repeated.

If it is determined at step S118 that the switch SW1 is turned off, the camera CPU 2 considered that the user has completed the image-taking and the process proceeds to step S119, where the flag ISONL is checked.

If the flag ISONL is set to 0, then it is determined that image vibration correction control is not performed and the process returns to step S100. On the other hand, if the flag ISONL is set to 1, then it is determined that image vibration correction has been performed and the process proceeds to step S120, where a lock instruction for the above-described lock mechanism 58 is sent. Like the unlock command described above, the lock command (its content differs from that of the unlock command) is sent from the camera CPU 2 to the lens CPU 11 as shown in the timing chart in FIG. 7(A).

At step S121, it is determined whether the locking is completed. If it is determined that the locking has been completed, the process proceeds to step S122 and the interrupt by the timer is disabled. Then, the process ends.

Figure 5:
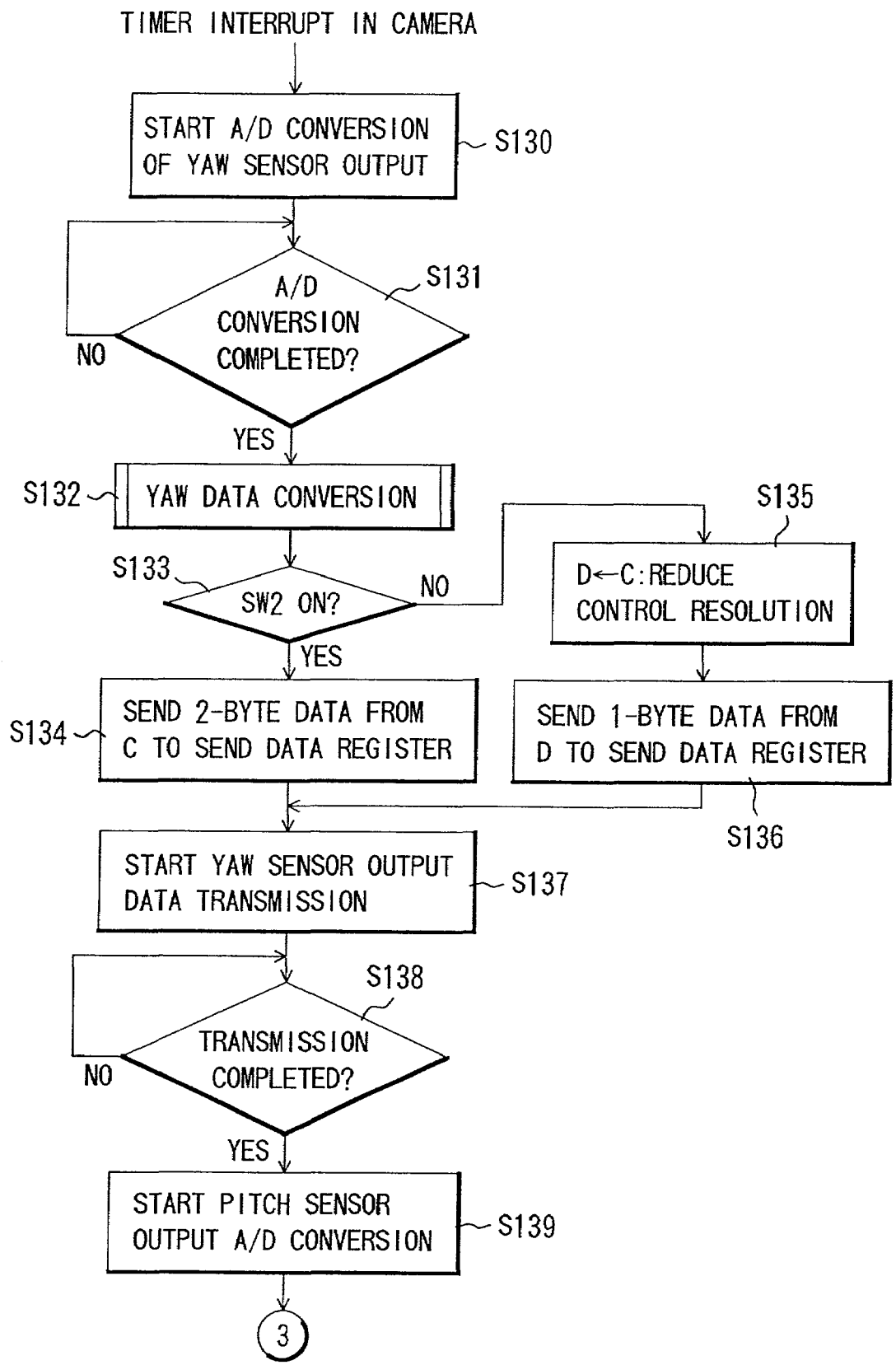
FIG. 5(A) and FIG. 5(B) are flowcharts of a timer interrupt operation in the camera CPU in the camera system shown in FIG. 1.
Figure 5:
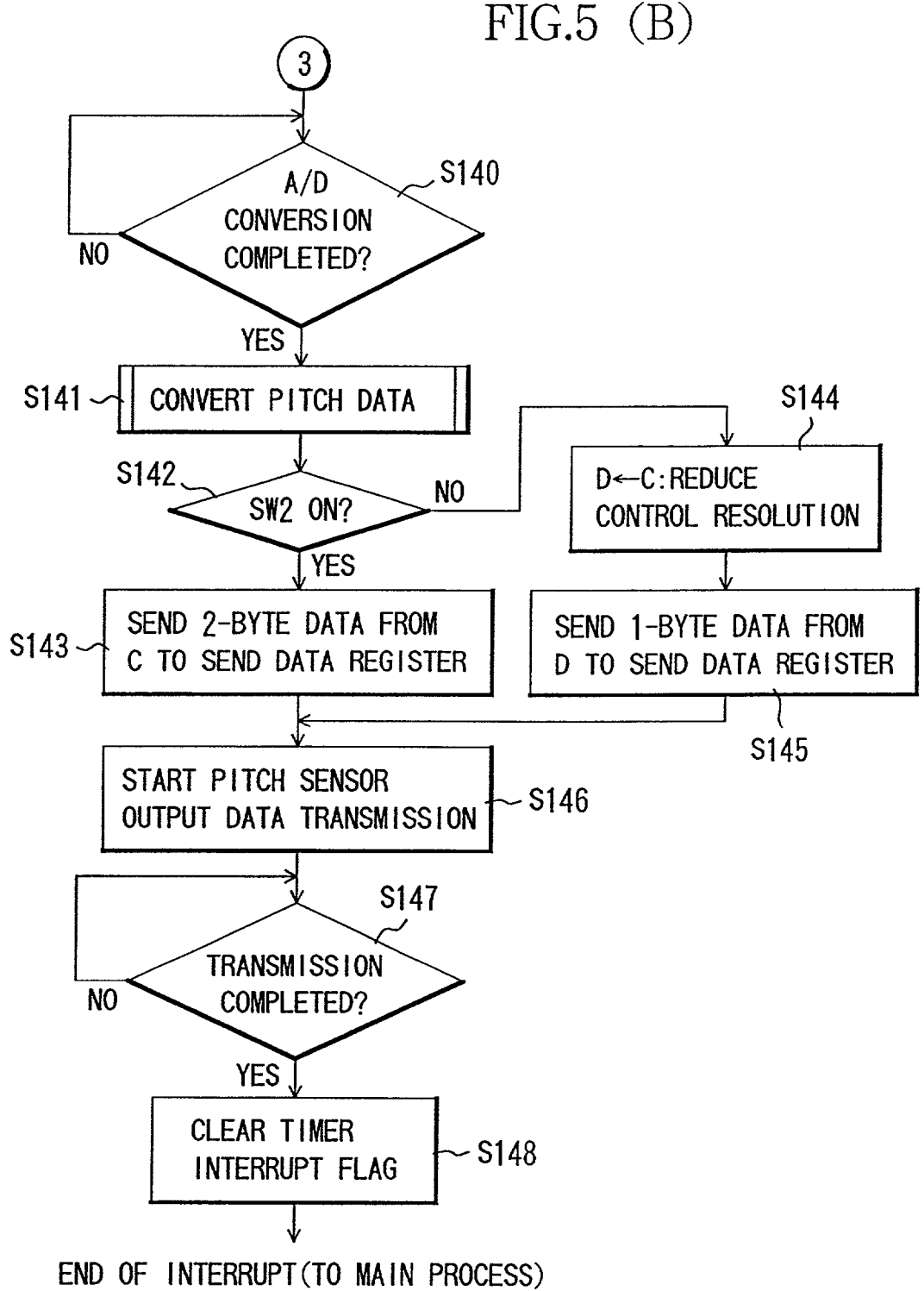

An interrupt process that occurs at predetermined intervals T mentioned above will be described with respect to flowcharts shown in FIGS. 5(A) and 5(B).

At step S130, an operation for converting an output from the yaw vibration sensor 5 shown in FIG. 1 into digital data by the A-D converter 3 is started. Then, when the completion of the above-described conversion is detected at step S131, the process proceeds to step S132, where predetermined calculations are performed on the result of the conversion.

This data conversion will be described with respect to a data conversion subroutine shown in FIG. 6.

Figure 6:
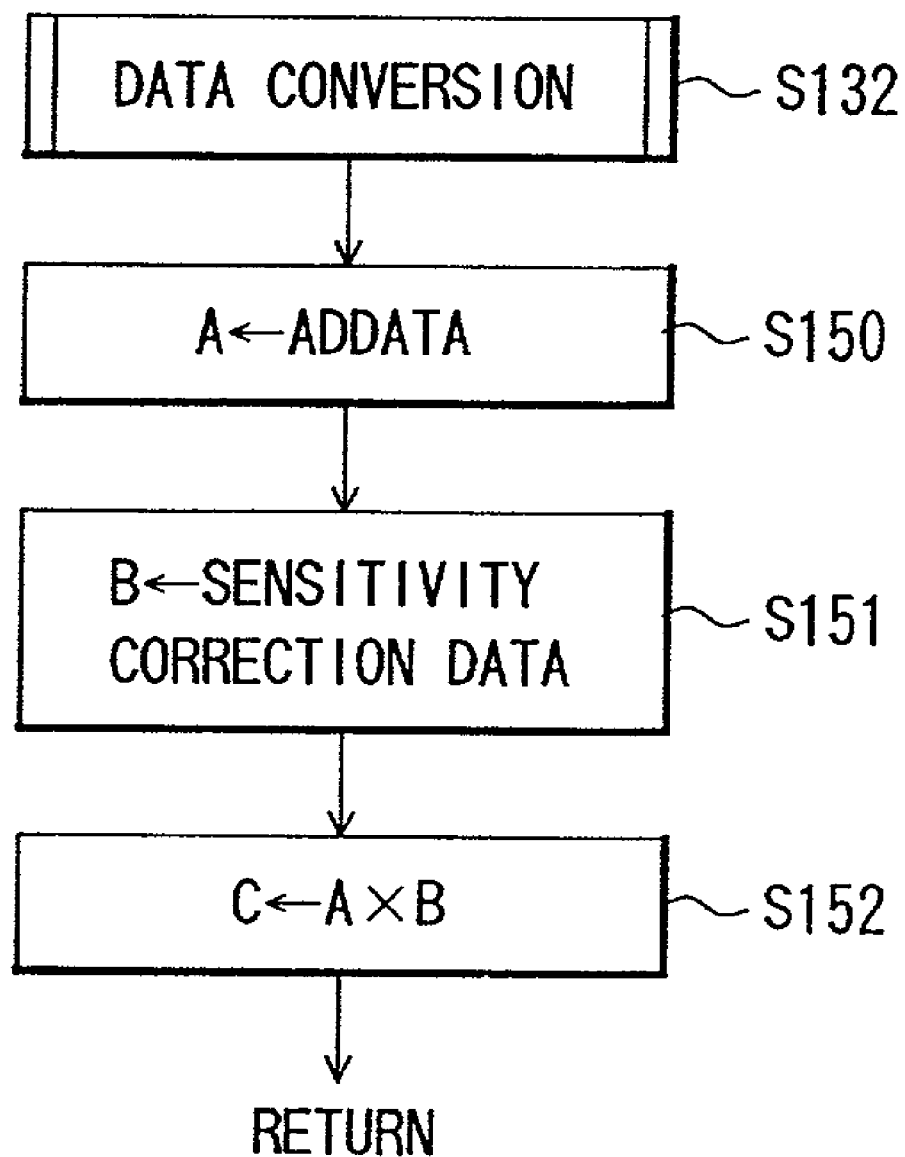
FIG. 6 is a flowchart of a data conversion subroutine performed in the camera system shown in FIG. 1.

In the data conversion subroutine in FIG. 6, the result of the A-D conversion stored in an ADDATA register is transferred to a general-purpose arithmetic register A in the camera CPU 2 at step S150. Then, data for correcting the sensitivity of each of the vibration sensors 4 and 5 is transferred to a general-purpose arithmetic register B at step S151. The value in the general-purpose arithmetic register A is multiplied by the value in the register B and the result is eventually stored in a register C at step S152.

Returning to FIGS. 5(A) and 5(B), it is determined at step S133 whether the switch SW2 is turned on. If it the switch SW2 is turned on, an image-taking operation has been started. Therefore, the process proceeds to step S134, where the data (2-byte vibration correction data) in the register C is transferred as is to a send data register in order to perform image correction control with the highest precision (highest resolution).

On the other hand, if the switch SW2 is not turned on at step S133, the switch SW1 is in the on state, that is, an image-taking preparation operation is being performed but the image-taking operation has not been started yet. Therefore, it is considered that image vibration correction control with that high precision is not required, and thus the process proceeds to step S135, where the data in the register C is converted into data whose minimum resolution, which is represented by 1 bit of vibration correction data, is lower than that in the on state of the switch SW2 (in other words, the smallest vibration correction amount represented by 1 bit is larger than that in the on sate of the switch SW2) and the resulting data (1-byte vibration correction data) is stored in a register D.

In the conversion herein, bit manipulation may be used to decrease the minimum resolution represented by 1 bit to reduce the length of the vibration correction data, for example.

Then, at step S136, the data in the register D is transferred to the send data register.

The vibration correction data conversion process from step S134 to S136 will be described below with respect to FIG. 11.

When the switch SW2 is turned on, if 1 bit of vibration correction data represents 0.001° (1 LSB=0.001°) and the maximum vibration correction angle is set to ±0.500°, for example, then 1,000 bits of data is required and at least 10 bits length of data is required to be sent from the camera 1 to the interchangeable lens apparatus 8. Therefore, the length of the send data (vibration correction data) will be 2 bytes.

On the other hand, the precision is reduced in the on state of switch SW1 (during the off state of witch SW2). For example, 1 bit is set to 0.004° (1 LSB=0.004°). In this case, the maximum vibration correction angle will be ±0.512° and the length of the data sent from the camera 1 to the interchangeable lens apparatus 8 is 8 bits, that is, 1 byte.

Returning to FIGS. 5(A) and 5(B), transmission of the vibration correction data is started at step S137. In practice, a command indicating a data output is sent first as shown in the timing charts in FIGS. 7(B) through 7(D) (this command contains a flag indicating whether the data is yaw or pitch vibration correction data and a flag indicating that the SW1 or SW2 is in the on state (see FIG. 7(B))).

Then, the data in the register C or D corresponding to the vibration correction data is sent as 1-byte data (see FIG. 7(C)) if switch SW1 is in the on state or as 2 byte serial data consisting of one upper byte and one lower byte (see FIG. 7(D)) if switch SW2 is in the on state.

When the completion of the vibration correction data transmission is detected at step S138, A-D conversion of pitch-direction vibration correction data is started at step S139. The process from step S139 to step S147 for the pitch-direction vibration correction data is exactly the same as the process from step S130 to S138 for yaw-direction vibration correction data and therefore the description of which will be omitted.

Finally, the timer interrupt flag is cleared to zero at step S148 and the interrupt process ends. Then the process returns to the main flow shown in FIGS. 4(A) and 4(B).

As described above, interrupts occur at regular intervals T in the process performed in the camera CPU 2 and vibration correction data calculated by the camera CPU 2 based on the outputs from the yaw and pitch vibration sensors 4 and 5 provided in the camera 1 is sent to the interchangeable lens apparatus 8 at the intervals.

Control performed in the interchangeable lens apparatus 8 will be described below with respect to flowcharts in FIGS. 8, 9(A) and 9(B).

Figure 8:
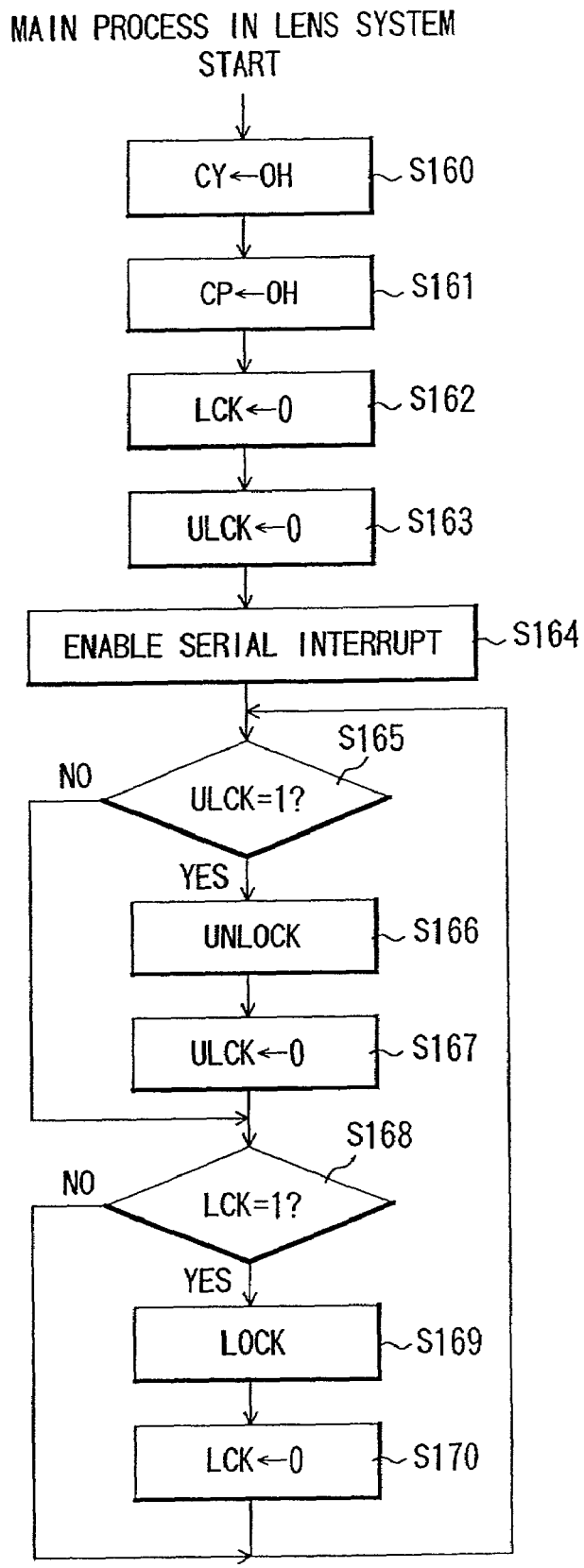
FIG. 8 is a flowchart of a main operation of a lens CPU in the camera system shown in FIG. 1.
Figure 9:
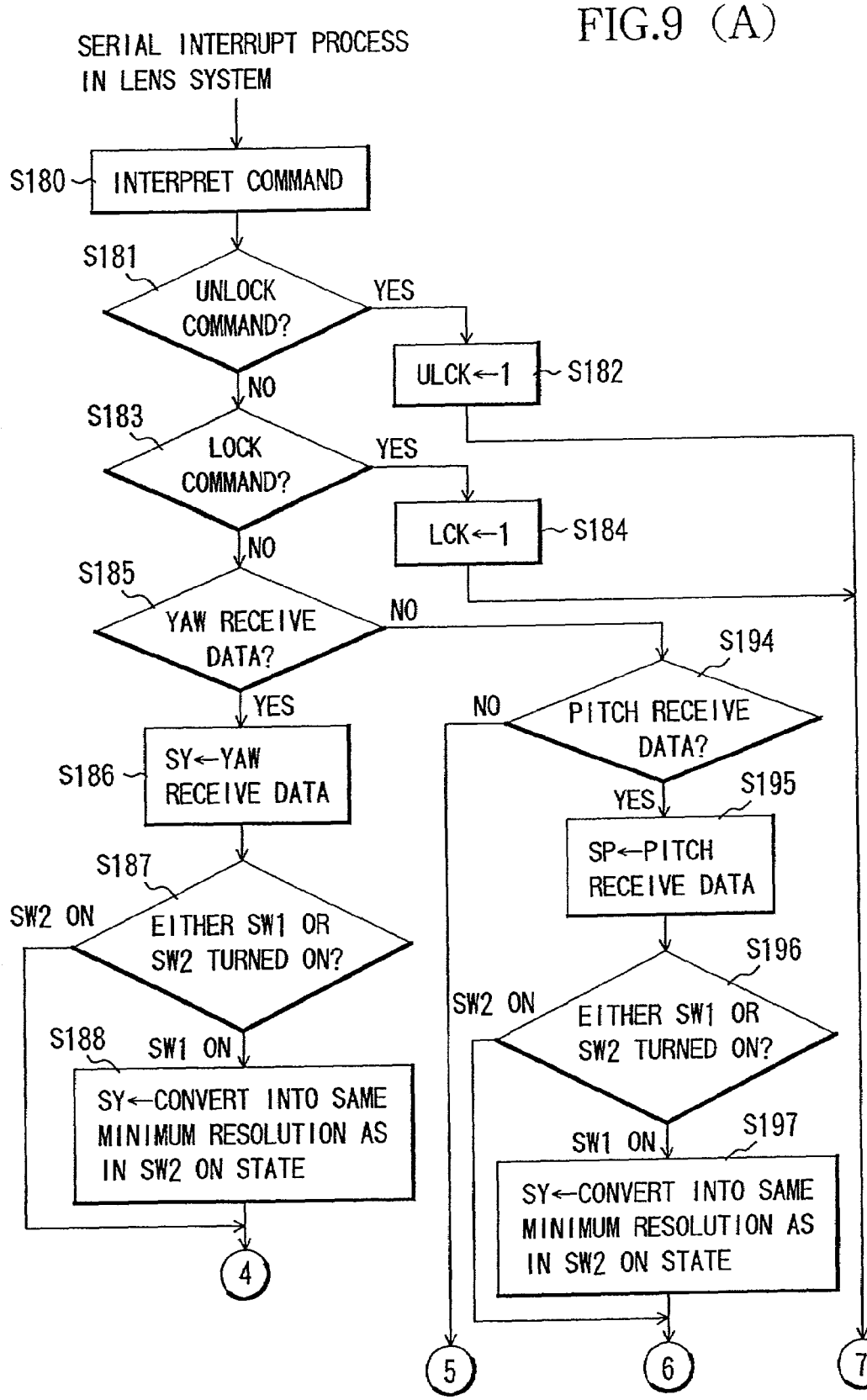
FIG. 9(A) and FIG. 9(B) are flowcharts of a serial interrupt operation in the lens CPU in the camera system shown in FIG. 1.
Figure 9:
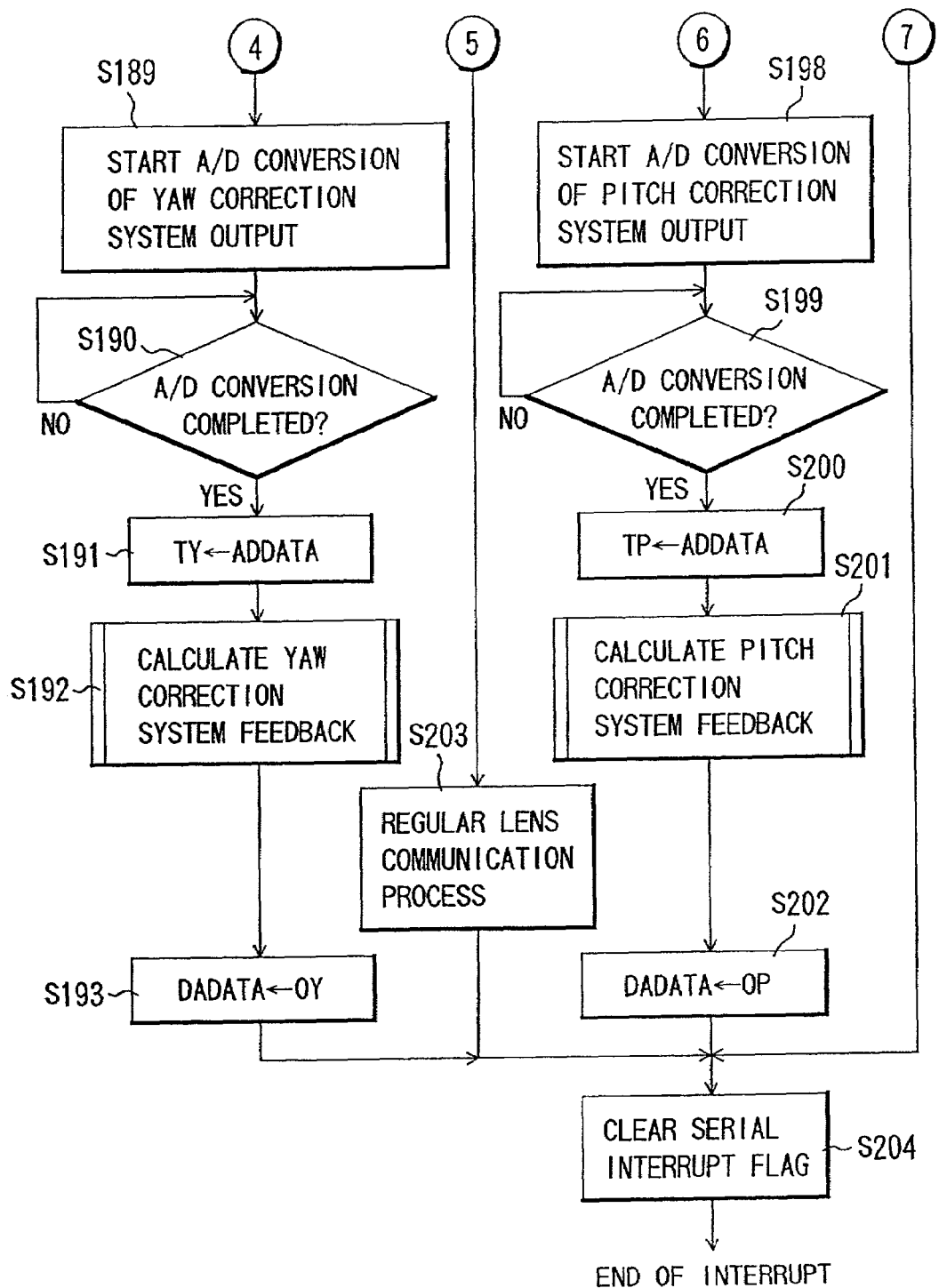

The flowchart in FIG. 8 shows a main process flow in the lens CPU 11. First, correction arithmetic internal registers CY and CP for controlling vibration correction lens 54 shown in FIG. 3 are reset to 0H at steps S160 and S161. Then, an LCK flag indicating locking control for the lock mechanism 58 shown in FIG. 3 is reset to 0 at step S162 and a ULCK flag indication unlocking control is reset to 0 at step S163.

Then, an interrupt for receiving a command and vibration correction data sent from the camera 1 as described above is enabled at step S164.

Then, it is determined whether a command indicating unlocking has been received during a serial interface communication interrupt process, which will be described later. If flag ULCK is reset to 0, it is determined that no unlock command has been received and the process proceeds to step S168. On the other hand, if flag ULCK is set to 1, it is determined that an unlock command has been received and the process proceeds immediately to step S166, where an unlock operation is performed.

In that case, a current in a predetermined direction is provided to an actuator (a plunger, for example) in the lock mechanism 58 through the driver circuit shown in FIG. 1 in response to a control signal from the lens CPU 11 to unlock the vibration correction lens 54. Then, the ULCK flag is reset to 0 at step S167.

At step 168, it is determined whether the LCK flag indicating locking is set to 0. If the LCK flag is reset to 0, it is determines that no lock command has been received and the process directly returns to step S165. On the other hand, if LCK is set to 1, it is determined that a lock command is received and the process proceeds to step S169, where a locking operation is performed immediately. Again, a current in the direction opposite to that in the unlock operation is provided to the actuator in the lock mechanism 58 in response to a control signal from the lens CPU 11 to cause a lever (not shown) provided in the lock mechanism 58 to force the movement of the vibration correction lens 54 to stop.

Finally, the LCK flag is reset to 0, the process returns to step S165 and the above-described steps are repeated at step S170.

A serial communication process in the interchangeable lens apparatus 8 will be described below with respect to FIGS. 9(A) and 9(B).

First, at step S180, a command sent from the camera 1 is interpreted to determine what is communicated. Then, whether it is an unlock instruction is determined at step S181.

If it is determined that the command is an unlock instruction, the process proceeds to step S182, where flag ULCK indicating unlocking is set to 1 in the lens CPU 11, then the process immediately proceeds to step S204. At step S204, a flag for a serial interrupt is cleared and then this interrupt process ends. Thus, the unlock operation is performed in the main process flow in FIG. 8 as described earlier.

On the other hand, if it is determined at step S181 that the command is not an unlock instruction, the process proceeds to step S183, where it is determined whether it is a lock instruction. If it is determined that the command is a lock instruction, the process proceeds to step S184, where flag LCK in the lens CPU 11 that indicates the lock instruction is set to 1, then, similarly to when the unlock command is received, the process proceeds to step S204, and then the interruption process ends.

If it is determined at step S183 that it is not a lock instruction, the process proceeds to step S185, where it is determined whether it is yaw vibration correction data. If it is determined that the received command matches an output command for yaw vibration correction data, the process proceeds to step S186. At step S186, serial data (1 byte or 2 bytes) in the formats as shown in the timing charts in FIGS. 7(C) and 7(D), that is, the vibration correction data, is stored in register SY in the lens CPU 11.

Then, it is determined whether switches SW1 or SW2 are turned on, based on a flag included in the command sent from the camera 1 that indicates whether switch SW1 or switch SW2 is in the on state.

If switch SW1 is in the on state, the process proceeds to step S188. Because the received vibration correction data is 1-byte data in the length, each bit of which represents a low minimum resolution (the amount of smallest vibration correction represented by 1 bit is large), a conversion process for making the minimum resolution equal to the resolution represented by 1 bit of 2-byte long vibration correction data received during the on state of switch SW2.

Bit manipulation, for example, may be used for this conversion. The process then proceeds to step S189.

The reason why the conversion of the vibration correction data is performed in the interchangeable lens apparatus 8 as described above will be described below.

The interchangeable lens apparatus 8 cannot perform proper image vibration correction control unless the minimum resolution in the interchangeable lens apparatus 8 is equalized with that of the camera 1.

In the present embodiment, the minimum resolution for image vibration correction control in the interchangeable lens apparatus 8 is adapted for 2-byte data. That is, it performs image vibration correction control with the minimum resolution, 1 bit=0.001 deg, whether the camera 1 is performing an image-taking preparation operation or image-taking operation. Therefore, if 1-byte data is sent to it, the data should be converted into 2-byte data. For example, if "1" (=0.004 deg) is sent in 1-byte data from the camera 1, the interchangeable lens apparatus 8 converts it into "4" (=0.004 deg) for performing the vibration correction control.

The precision of image vibration correction is not increased by converting the 1-byte data into the 2-byte data as described above. This is because the precision of image vibration correction is determined only by the precision of data sent from the camera 1. The interchangeable lens apparatus 8 is always performs image vibration correction with a minimum resolution, 1 bit=0.001 deg (which is the performance of the interchangeable lens apparatus 8).

Returning to FIGS. 9(A) and 9(B), if switch SW2 is in the on state at step S187, the process directly proceeds to step S189. At step 189, outputs form the yaw position detection sensors 15 shown in FIG. 1 for detecting the movement of the vibration correction optical unit 9 in the yaw-direction is converted by the A-D converter into digital data.

Then, at step S190, it is determined whether the A-D conversion has been completed. If the conversion has been completed, the process proceeds to step S191, where the result of the conversion is transferred to register TY in the lens CPU 11.

Then, feedback for the yaw image vibration correction system is performed for the purpose of matching the vibration correction data stored in the SY register to data stored in the TY register, which is an output indicating the position of the vibration correction optical unit 9 (vibration correction lens 54). The method will be described below with reference to a flowchart shown in FIG. 10.

Figure 10:
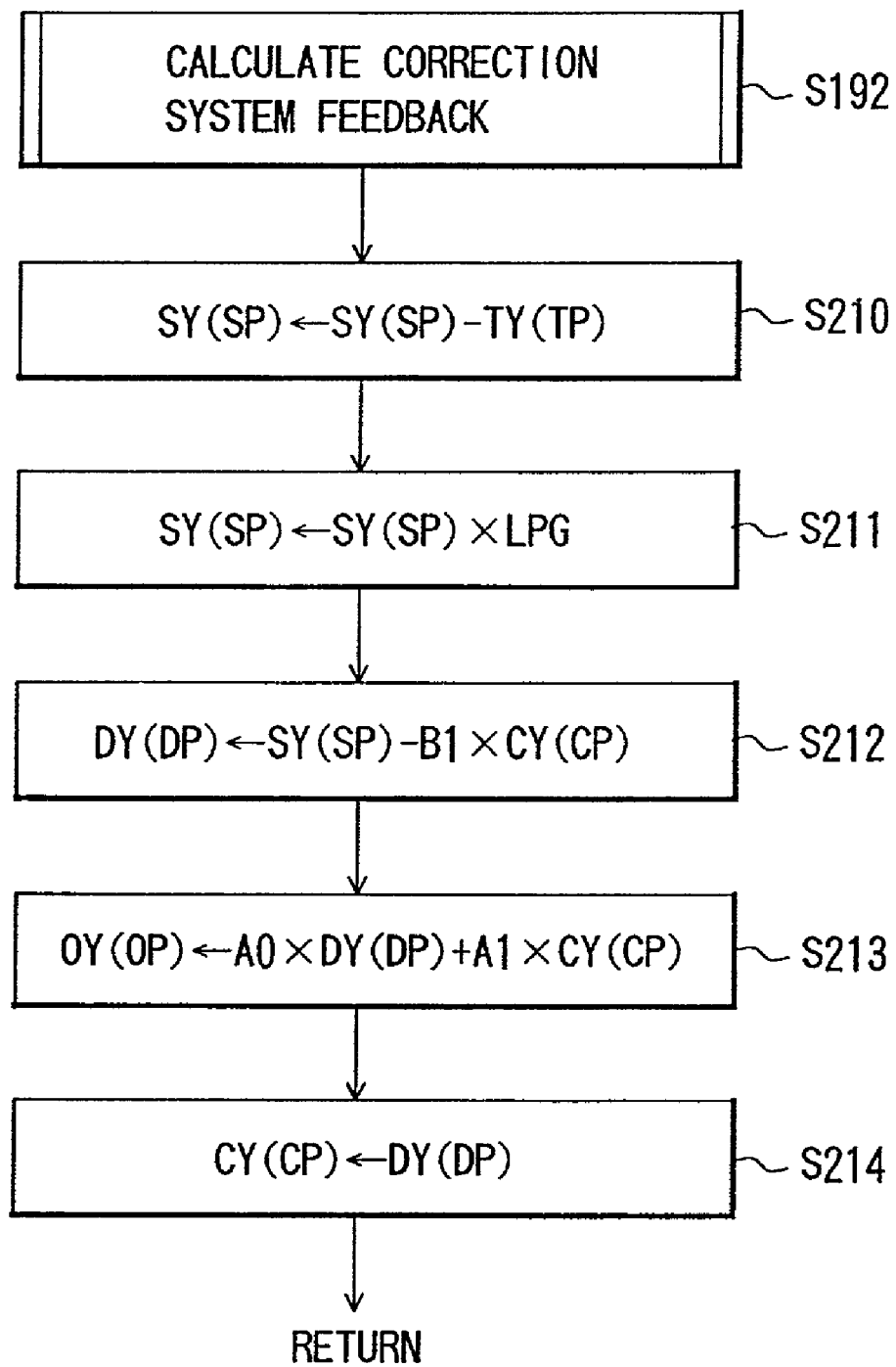
FIG. 10 is a flowchart of a correction system feed back calculation subroutine performed in the camera system shown in FIG. 1.
Figure 12:
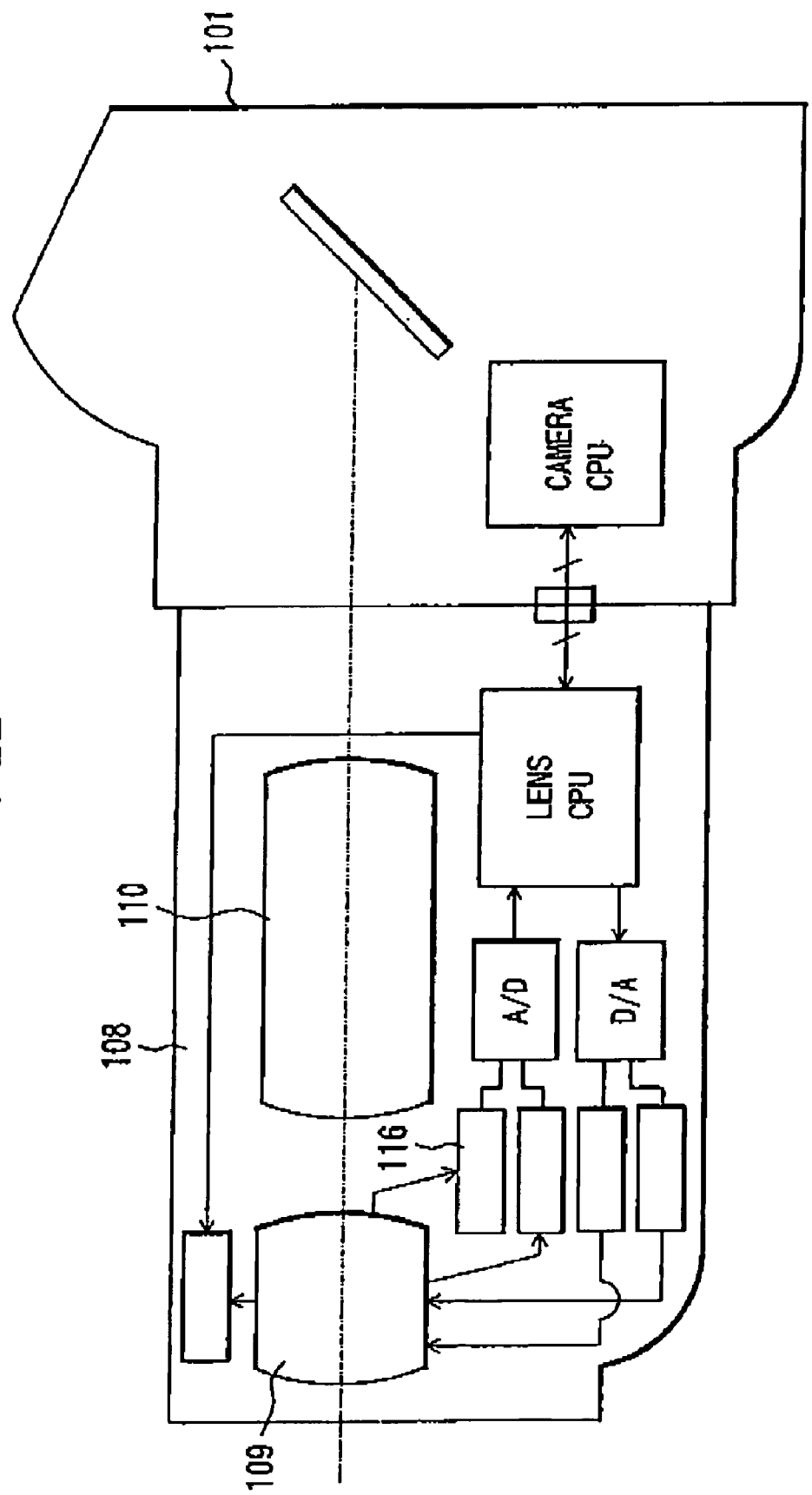
FIG. 12 shows a configuration of a camera system having image vibration correction function according to prior art.

First, at step S210 in FIG. 10, a difference between a value in the SY register (or an SP register for correction in the pitch-direction) and a value in the TY register (or a TP register for the correction in the pitch-direction) (hereinafter registers used for pitch-direction correction will be parenthesized) is found, and found difference is stored in the SY (SP) register.

Then, the difference is multiplied by a predetermined data LPG used for determining a loop gain for feedback control of the correction system at step S211. The result is again stored in the SY (SP) register.

The subsequent steps S212 through S214 represent a flowchart for performing phase compensation calculations (primary phase-lead compensation is shown). Values for factors B1, A0, and A1 used in this chart are preset by known S-Z conversion.

First, at step S212, a value (determined in the previous sampling) stored in arithmetic register CY (CP) multiplied by predetermined factor B1 is subtracted from the value in the SY (SP) register and the result is stored in register DY (DP). Then, a product-sum operation is performed at step 213 in which the value in register DY (DP) multiplied by predetermined factor A0 is added to the value in register CY (CP) multiplied by predetermined factor A1 and the final result is stored in register OY (OP).

Finally, at step S214, the value in register DY (DP) is transferred to register CY (CP) for the subsequent calculation, then the feedback calculation for the correction system ends.

Returning to FIGS. 9(A) and 9(B), the value in register OY, which is the result of the yaw-direction correction system feedback described above, is transferred to the D-A converter 12 shown in FIG. 1 as DADATA at step S193. A current corresponding to this output value is applied to the coil assembly 52 of the vibration correction optical unit 9 through the driver circuit 13 to drive the vibration correction lens 54 shown in FIG. 1 in the yaw-direction based on the yaw-direction vibration correction data. After the completion of the control operation, the process immediately proceeds to step S204 and the interrupt process ends.

On the other hand, if it is determined at step S185 that the received command is not an output command for yaw vibration correction data, the process proceeds to step S194, where it is determined whether the received command is an output command for pitch vibration correction data.

If it is determined that the command is an output command for pitch vibration correction data, steps S195 through S202 are performed for drive control of the vibration correction optical unit 9 in the pitch direction. These steps are the same as steps S186 through S193 that show the drive control in the yaw direction and therefore the description of which will be omitted.

If it is determined at step S194 that the received command is not an output command for pitch vibration correction data, the process proceeds to step S203, where regular lens data communication (for example, data communication for an operation such as automatic focusing or aperture control) is performed, and after the completion of the operation, a interruption flag for the serial communication is cleared at step S204, then the entire serial interrupt process ends.

According to the embodiment described above, the minimum resolution (the smallest amount of vibration correction) represented by each bit of vibration correction data sent from the camera 1 to the interchangeable lens apparatus 8 is changed and the length of the data is also changed depending on whether the camera 1 is performing an image-taking preparation operation or image-taking operation, thus reducing the length of the send data during operations other than the image-taking operation, in which vibration correction precision is not necessarily required. As a result, the load on the camera CPU 2 can be reduced.

In particular, the minimum resolution for image vibration correction control is reduced, that is, the length of vibration correction data sent from the camera 1 to the interchangeable lens apparatus 8 is reduced from 2 byte to 1 bytes during an image-taking preparation operation (in the on state of switch SW1) in which high precision of image vibration correction is not required and communicating traffic between the camera 1 and the lens apparatus 8 is high. Thus, the load on the camera CPU 2 can be reduced.

On the other hand, control resolution is maintained high during an image-taking operation (in the switch SW2 on state) in which a higher precision for vibration correction is required and communicating traffic between the camera 1 and lens apparatus 8 is lower than during an image-taking preparation operation, in order to accomplish adequate image vibration correction. Thus, the shot picture is not adversely affected.

A vibration detector used in the above-described embodiment may be an angular acceleration meter, angular speedometer, speedometer, angular displacement meter, displacement meter, or any other method or measures that can detect an image vibration itself.

The vibration correction optical unit is not limited to the shift-type unit that moves the vibration correction lens 54 within the plane orthogonal to the optical axis. It may be a unit using an apex-angle-variable (vari-angle) prism or a unit that rotates (swing) the vibration correction lens with respect to the optical axis.

As described above, a camera system including a camera 1 and an interchangeable lens apparatus 8 can be provided according to the present invention in which loads on a camera CPU 2, which is a control circuit for performing calculations for various control operations and image vibration correction, in the camera 1 is reduced and the image vibration correction can be performed properly with an inexpensive configuration.

While a preferred embodiment has been described, it is to be understood that modification and variation of the present invention may be made without departing from the sprit or scope of the following claims.

What is claimed is:

1. A camera system including a camera and a lens apparatus detachable from the camera, comprising:
 a communication circuit which communicates data between said camera and said lens apparatus;
 a vibration detector provided in said camera, which detects a camera shake;
 a camera control circuit provided in said camera, which calculates vibration correction data based on an output from said vibration detector and sends the calculated vibration correction data to said lens apparatus through said communication circuit;
 a vibration correction optical member provided in said lens apparatus, which is driven for correcting an image vibration;
 a vibration correction driving unit provided in said lens apparatus, which drives said vibration correction optical member; and
 a lens control circuit provided in said lens apparatus, which controls said vibration correction driving unit based on the vibration correction data sent from said camera through said communication circuit;
 wherein, said camera control circuit sends said vibration correction data with a first data length to said lens apparatus during an image-taking operation of said camera and sends said vibration correction data with a second data length shorter than said first data length to said lens apparatus during an image-taking preparation operation of said camera; and
 wherein said lens control circuit controls said vibration correction driving unit based on said vibration correction data with said first data length sent from said camera, converts said vibration correction data with said second data length into data equivalent to said vibration correction data with said first data length and controls said vibration correction driving unit based on the converted vibration correction data.

2. A camera system including a camera and a lens apparatus detachable from the camera, comprising:
 a communication circuit, which communicates data between said camera and said lens apparatus;
 a vibration detector provided in said camera, which detects a camera shake;
 a camera control circuit provided in said camera, which calculates a camera vibration correction data representing the amount of vibration correction based on an output from said vibration detector and sends the calculated vibration correction data to said lens apparatus through said communication circuit;
 a vibration correction optical member provided in said lens apparatus, which is driven for correcting an image vibration;
 a vibration correction driving unit provided in said lens apparatus, which drives said vibration correction optical member; and
 a lens control circuit provided in said lens apparatus, which controls said vibration correction driving unit based on the vibration correction data sent from said camera through said communication circuit;
 wherein: said vibration correction data calculated by said camera control circuit is first and second correction data; said first vibration correction data represents said vibration correction amount in a plurality of bits, one bit unit of said plurality of bits represents a fast minimum correction amount; said second vibration correction data represents said vibration correction amount in a plurality of bits, one bit unit of said plurality of bits represents a second minimum correction amount larger than said first minimum correction amount;
 said camera control circuit sends said first vibration correction data to said lens apparatus during art image-taking operation of said camera and sends said second vibration correction data to said lens apparatus during an image-taking preparation operation of said camera;
 said lens control circuit controls said vibration correction driving unit based on said first vibration correction data sent from said camera, converts said second vibration correction data sent from said camera into data equivalent to said first vibration correction data and controls said vibration correction driving unit based on the converted vibration correction data.

3. A camera which a lens apparatus can be attached to and detached from, said lens apparatus controlling a drive for a vibration correction optical member based on vibration correction data sent from the camera in order to correct an image vibration, said camera comprising:

a communication circuit which communicates data between said camera and said lens apparatus;

a vibration detector which detects a camera shake; and a camera control circuit which calculates vibration correction data based on an output from said vibration detector and sends the calculated vibration correction data to said lens apparatus through said communication circuit;

wherein, said camera control circuit sends said vibration correction data with a first data length to said lens apparatus during an image-taking operation of said camera, and sends said vibration correction data with a second data length shorter than said first data length to said lens apparatus during an image-taking preparation operation of said camera.

4. A camera which a lens apparatus can be attached to and detached from, said lens apparatus controlling a drive for a vibration correction optical member based on vibration correction data sent from the camera in order to correct an image vibration, said camera comprising:

a communication circuit which communicates data between said camera and said lens apparatus;

a vibration detector which detects a camera shake; and a camera control circuit which calculates vibration said vibration correction data based on an output from said vibration detector and sends the calculated vibration correction data to said lens apparatus through said communication circuit;

wherein: said vibration correction data calculated by said camera control circuit is first and second correction data;

said first vibration correction data represents said vibration correction amount in a plurality of bits, one bit unit of said plurality of bits represents a first minimum correction amount;

said second vibration correction data represents said vibration correction amount in a plurality of bits, one bit unit of said plurality of bits represents a second minimum correction amount larger than said first minimum correction amount;

said camera control circuit sends said first vibration correction data to said lens apparatus during an image-taking operation of said camera and sends said second vibration correction data to said lens apparatus during an image-taking preparation operation of said camera.

5. A lens apparatus capable of being attached to and detached from a camera, said camera calculating vibration correction data based on an output from a vibration detector that detects vibration due to a camera shake, outputting vibration correction data with a first data length during an image-taking operation, and outputting vibration correction data with a second data length shorter than said first data length during an image-taking preparation operation, said lens apparatus comprising:

a communication circuit which communicates data between said lens apparatus and said camera;

a vibration correction optical member which is driven for correcting an image vibration;

a vibration correction driving unit which drives said vibration correction optical member; and a lens control circuit which controls said vibration correction driving unit based on said vibration correction data sent from said camera through said communication circuit;

wherein, said lens control circuit controls said vibration correction driving unit based on said vibration correction data with said first data length, said lens control circuit converts said vibration correction data with said second data length into data equivalent to said vibration correction data with said first data length and controls said vibration correction driving unit based on the converted vibration correction data.

6. A lens apparatus capable of being attached to and detached from a camera, said camera calculating vibration correction data representing the amount of vibration correction based on an output from a vibration detector that detects vibration due to a camera shake, outputting a first vibration correction data during an image-taking operation and outputting a second vibration correction data during an image-taking preparation operation, said first vibration correction data representing said vibration correction amount in a plurality of bit, one bit of which represents a first minimum vibration correction amount, and said second correction data representing said vibration correction amount in a plurality of bit, one bit of which represents a second minimum vibration correction amount larger than said first minimum correction amount, said lens apparatus comprising:

a communication circuit which communicates data between said lens apparatus and said camera;

a vibration correction optical member which is driven for correcting an image vibration;

a vibration correction driving unit which drives said vibration correction optical member; and a lens control circuit which controls said vibration correction driving unit based on said vibration correction data sent from said camera through said communication circuit;

wherein: said lens control circuit controls said vibration driving unit based on said first vibration correction data sent from said camera, converts said second vibration correction data sent from said camera into data equivalent to said first vibration correction data and controls said vibration correction driving unit based on the converted vibration correction data.

* * * * *

UNITED STATES PATENT AND TRADEMARK OFFICE
CERTIFICATE OF CORRECTION

| | |
|---|---|
| PATENT NO. | : 7,057,644 B2 |
| APPLICATION NO. | : 10/172646 |
| DATED | : June 6, 2006 |
| INVENTOR(S) | : Kazunori Masuda |

Page 1 of 1

It is certified that error appears in the above-identified patent and that said Letters Patent is hereby corrected as shown below:

<u>Column 14</u>

Line 44, replace "fast" with "first".

Line 52, replace "art" with "an".

Signed and Sealed this

Twenty-second Day of August, 2006

JON W. DUDAS
*Director of the United States Patent and Trademark Office*